United States Patent
Fukuda et al.

(10) Patent No.: US 9,945,293 B2
(45) Date of Patent: Apr. 17, 2018

(54) TAPERED THREAD FOR GAS TURBINE SHROUD

(71) Applicant: Mitsubishi Hitachi Power Systems, Ltd., Yokohama, Kanagawa (JP)

(72) Inventors: Tatsuya Fukuda, Hitachi (JP); Yasuyuki Watanabe, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 293 days.

(21) Appl. No.: 14/534,463

(22) Filed: Nov. 6, 2014

(65) Prior Publication Data

US 2015/0128613 A1    May 14, 2015

(30) Foreign Application Priority Data

Nov. 8, 2013   (JP) ................................. 2013-231901

(51) Int. Cl.
  *F02C 7/20*    (2006.01)
  *F02C 3/04*    (2006.01)
  *F01D 25/24*   (2006.01)

(52) U.S. Cl.
  CPC .............. *F02C 7/20* (2013.01); *F01D 25/246* (2013.01); *F02C 3/04* (2013.01); *F05D 2230/64* (2013.01); *F05D 2240/11* (2013.01); *F05D 2260/94* (2013.01)

(58) Field of Classification Search
  CPC .. F02C 7/20; F02C 3/04; F01D 25/246; F05D 2230/64
  See application file for complete search history.

(56) References Cited

U.S. PATENT DOCUMENTS

| 2,396,469 | A | 3/1946 | Meigs | |
|---|---|---|---|---|
| 8,870,171 | B2 * | 10/2014 | Herbold | B23B 47/284 269/87.3 |
| 2012/0204398 | A1 * | 8/2012 | Herbold | B23B 47/284 29/426.2 |

FOREIGN PATENT DOCUMENTS

| JP | 10-281129 A | 10/1998 |
|---|---|---|
| JP | 2004-11853 A | 1/2004 |
| JP | 2005-199294 A | 7/2005 |
| JP | 2009-109412 A | 5/2009 |

OTHER PUBLICATIONS

JP 2004-011853, English Translation of Specification.*
European Search Report dated Mar. 9, 2015 (Seven (7) pages).
Japanese Office Action issued in counterpart Japanese Application No. 2013-231901 dated Jun. 6, 2017 with English-language translation (five (5) pages).

* cited by examiner

*Primary Examiner* — Richard Edgar
*Assistant Examiner* — John S Hunter
(74) *Attorney, Agent, or Firm* — Crowell & Moring LLP

(57) ABSTRACT

The object of the present invention is to reduce galling that occurs at a tapered thread according to generation of excessive pressure on a tip end side of the tapered thread. In order to attain the above-mentioned object, a tapered thread according to the present invention is characterized in that it is a tapered thread comprising a taper-shaped external thread threadedly engaged with a taper-shaped internal thread formed in a member that is to be fastened, a tapered thread center hole is formed in a bottom surface of the external thread, and a depth of the tapered thread center hole is not more than a half of an axial length of the external thread.

1 Claim, 4 Drawing Sheets

TAPERED THREAD FOR GAS TURBINE SHROUD

CLAIM OF PRIORITY

The present application claims priority from Japanese Patent application serial no. 2013-231901, filed on Nov. 8, 2013, the content of which is hereby incorporated by reference into this application.

FIELD OF THE INVENTION

The present invention relates to a tapered thread and a gas turbine and to, for example, a tapered thread and a gas turbine which are suitable for use in a turbine casing that is a high temperature-pressure vessel.

BACKGROUND OF THE INVENTION

Generally, in a gas turbine, a structure is frequently used in which in order to lock circumferential movement of a shroud segment, holes are formed in some circumferential portions of the shroud segment and turbine casing and the shroud segment is fixed to the turbine casing by inserting pins into the holes.

The pins fixing the shroud segment and the turbine casing are referred to as shroud lock pins. The shroud lock pins are inserted into shroud lock pin holes, passing through the turbine casing, from the outside of the turbine casing and lock the circumferential movement of the shroud casing and the turbine casing.

The shroud lock pin holes which pass through the turbine casing and into which the shroud lock pins are inserted have covers provided by tapered threads in order that the shroud lock pins are prevented from coming out of the holes or gas inside the turbine casing is prevented from leaking out of the turbine casing due to a difference in internal and external pressure of the turbine casing. The use of the tapered threads causes axial force of the threads to act in radial directions of the threads due to wedge effects of the tapered threads, thus making it possible to prevent the gas inside the turbine casing from leaking out of the turbine casing.

Incidentally, Patent Literatures 1 and 2 are listed as prior art literatures relating to the tapered threads.

PRIOR ART LITERATURE

Patent Literature

Patent Literature 1: Japanese Patent Application Laid-Open Publication No. Hei. 10-281129
Patent Literature 2: Japanese Patent Application Laid-Open Publication No. 2004-11853

However, with the above-mentioned prior art, there is a problem that the turbine casing and the thread portion thereof are exposed to high temperature for a long time and pressure that is applied to a tip end side of the tapered thread is increased relative to a root side of the tapered thread, whereby considerable galling occurs at the tapered thread of the turbine casing.

The present invention has been made in view of the above-mentioned problem and the object of the present invention is to provide a tapered thread and a gas turbine which can reduce galling occurring at the tapered thread.

SUMMARY OF THE INVENTION

In order to attain the above-mentioned object, the tapered thread according to the present invention is a tapered thread which comprises a taper-shaped external thread that is threadedly engaged with a taper-shaped internal thread formed in a member that is to be fastened and in which a tapered thread center hole is formed in a bottom surface of the external thread and a depth of the tapered thread center hole is not more than a half of an axial length of the external thread.

In order to attain the above-mentioned object, the gas turbine according to the present invention comprises a compressor adiabatically compressing air taken in from the atmosphere, as operation fluid, a combustor mixing and combusting the compressed air supplied from the compressor and fuel, to thereby produce high temperature-high pressure gas, and a turbine in which moving vanes and stationary vanes are alternately arranged, the turbine being adapted to generate rotary power at the time of expansion of combusted gas introduced from the combustor, in which shroud segments are provided at upper portions of the moving vanes, the shroud segments are axially and radially fixed to a turbine casing and circumferentially fixed to the turbine casing by shroud lock pins that are inserted into shroud lock pin holes formed in the turbine casing, and covers are provided to the shroud lock pin holes by tapered threads, in which each of the tapered threads is a tapered thread having the above-mentioned structure.

In accordance with the present invention, considerable reduction in galling that occurs at the tapered thread can be expected.

DETAILED DESCRIPTION OF THE PREFERRED EMBODIMENT

A tapered thread and a gas turbine according to the present invention will be explained hereinafter based on an illustrated embodiment. Incidentally, in each Figure, the same reference signs are applied to the same components.
Embodiment 1
As an embodiment 1 of the present invention, an example in which a tapered thread according to the present invention is applied to a gas turbine is explained.

Figure 1:
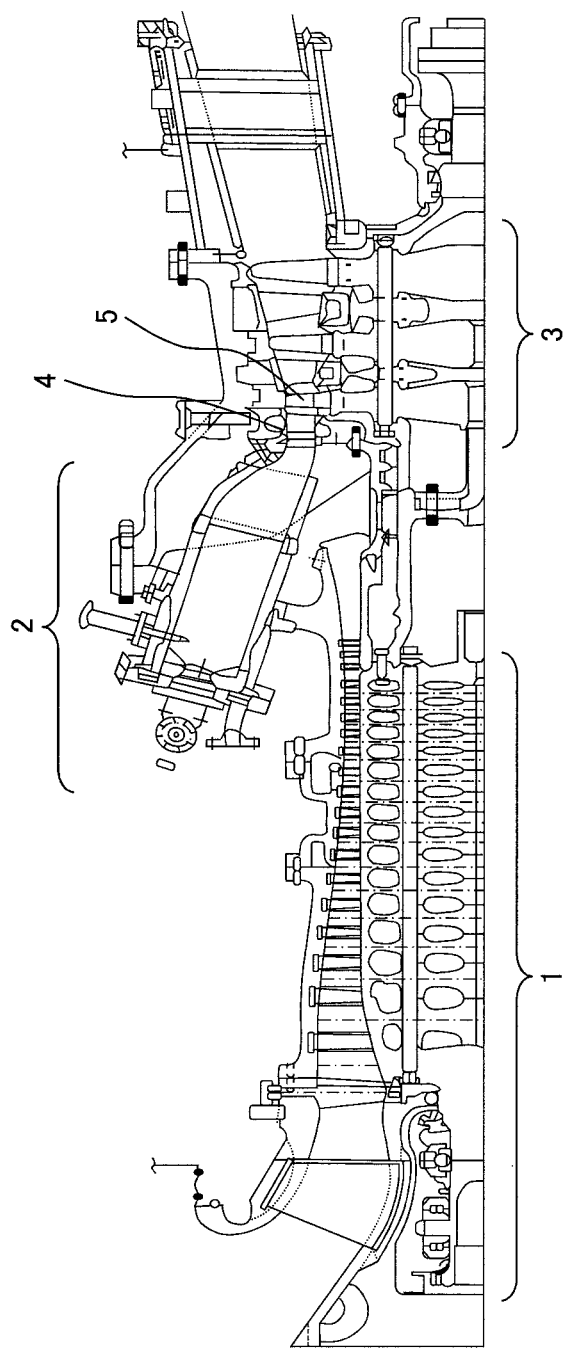
FIG. 1 is a sectional view of gas turbine equipment according to an embodiment 1 of the present invention.

First of all, an entire structure of a gas turbine to which the present invention is applied is explained with reference to FIG. 1. As shown in FIG. 1, the gas turbine is schematically configured by a compressor 1, a combustor 2 and a turbine 3 into which the gas turbine is largely classified. The compressor 1 adiabatically compresses air, taken in from the atmosphere, as operation fluid. The combustor 2 mixes and combusts the compressed air supplied from the compressor 1 and fuel, thereby to produce high temperature-high pressure gas. The turbine 3 generates rotary power at the time of expansion of the combusted gas introduced from the combustor 2. Incidentally, exhaust gas from the turbine 3 is discharged to the atmosphere.

Figure 2:
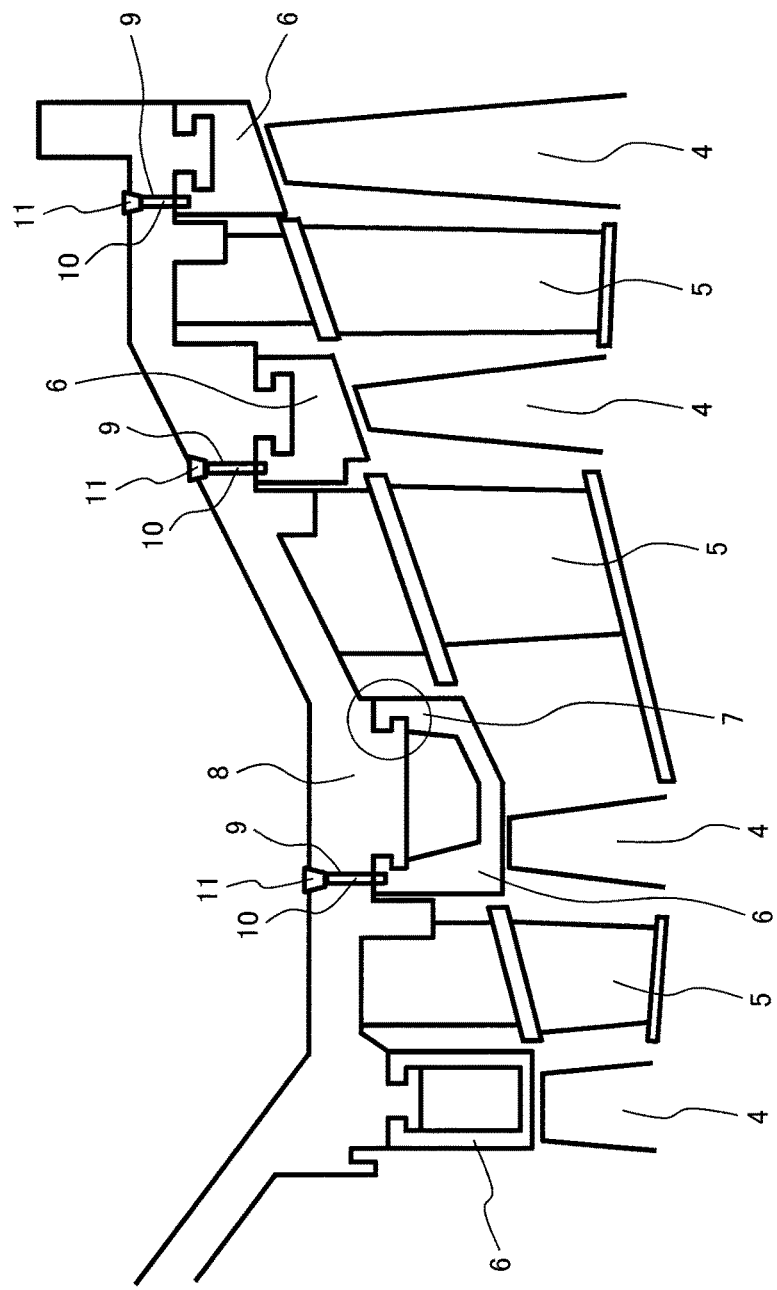
FIG. 2 is an enlarged partial view of a neighborhood of a connection portion between a combustor liner and a tail tube of the gas turbine equipment according to the embodiment 1 of the present invention.

FIG. 2 is an enlarged partial view of the turbine 3. As shown in this Figure, in the turbine 3, turbine moving vanes 4 and turbine stationary vanes 5 are alternately arranged and conversion of energy of the combusted gas into the rotary power is devised in such a manner to be efficiently carried out. As an example of this idea, shroud segments 6 are provided at upper portions of the turbine moving vanes 4. At the shroud segments 6, structures which seal the leakage of the combusted gas from the upper portions of the turbine moving vanes 4 are provided.

The shroud segments 6 are axially and radially fixed to a turbine casing 8 by key structures 7. On the other hand, circumferential portions of the respective shroud segments 6 are fixed at two points thereof to the turbine casing 8 by inserting shroud lock pins 10 into shroud lock pin holes 9 which are formed in the turbine casing 8.

Moreover, in order that the shroud lock pins 10 are prevented from coming out of the holes or combusted gas inside the turbine casing 8 is prevented from leaking out of the turbine casing 8 via the shroud lock pin holes 9 due to a difference in internal and external pressure of the turbine casing 8, covers are provided to the shroud lock pin holes 9 by tapered threads 11.

Figure 3:
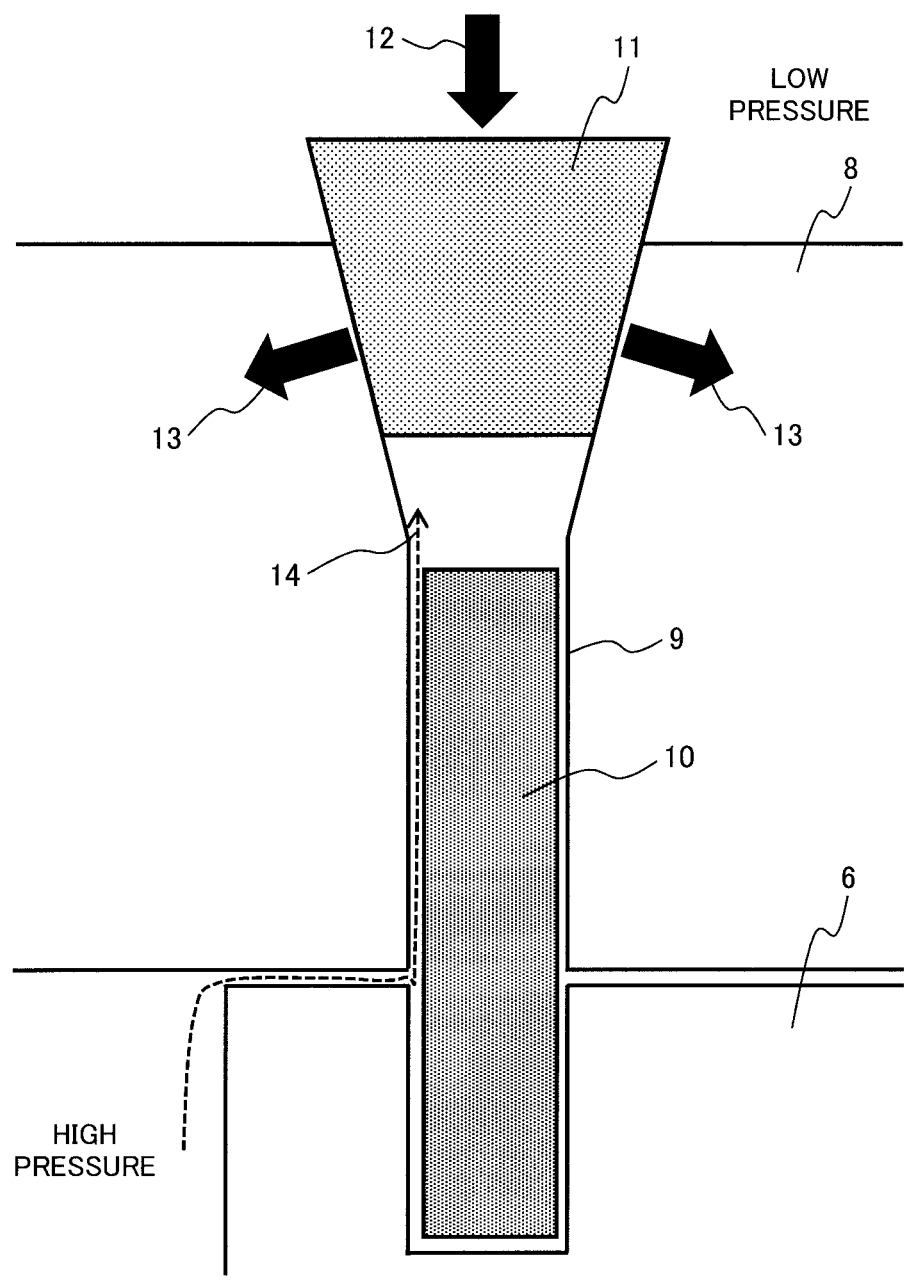
FIG. 3 is a sectional view showing a state where a shroud lock pin is inserted into a shroud lock pin hole, which is formed in a turbine casing of the gas turbine equipment according to the embodiment 1 of the present invention, and the shroud lock pin hole is covered with a tapered thread.

The cover is provided to each shroud lock pin hole 9 by the tapered thread 11, whereby as shown in FIG. 3, tapered thread axial force 12 which is added to the tapered thread 11 also acts in radial directions of the threads due to a wedge effect of the tapered thread 11 (radial components 13 of the tapered thread axial force), thus making it possible to prevent the gas inside the turbine casing 8 from leaking out of the turbine casing 8 (a combusted gas leakage pass 14).

Figure 4A:
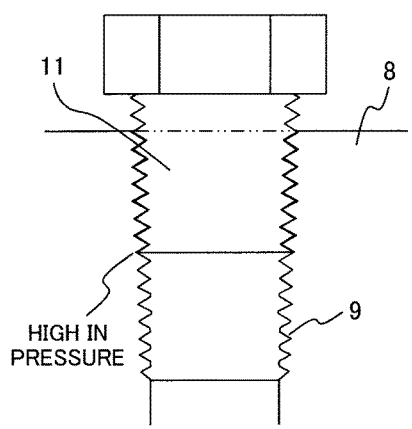
FIGS. 4a and 4b are views showing a relationship among a prior art tapered thread, an axial position of the tapered thread, and a thread crest surface pressure distribution.
Figure 4B:
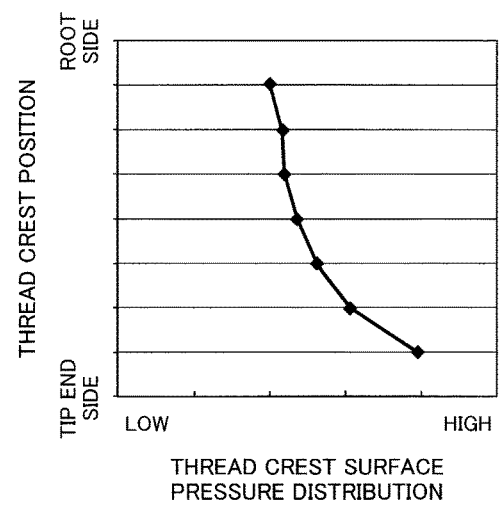

However, because the turbine casing 8 and the thread portion thereof are exposed to high temperature for a long time or because of a taper shape of the tapered thread 11, with a prior art structure shown in FIGS. 4a and 4b, there is a problem that excessive pressure is applied to a tip end side of the tapered thread 11, whereby considerable galling occurs at the tapered thread 11 used in the turbine casing 8.

Figure 5A:
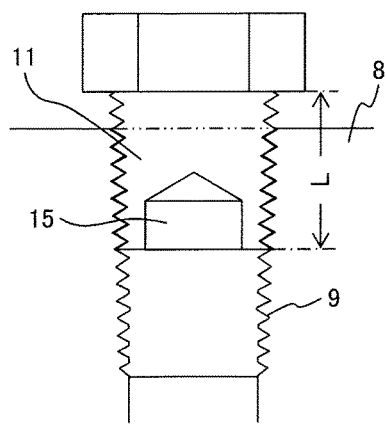
FIGS. 5a and 5b are views showing a relationship among a tapered thread according to the present invention, an axial position of the tapered thread, and a thread crest surface pressure distribution.
Figure 5B:
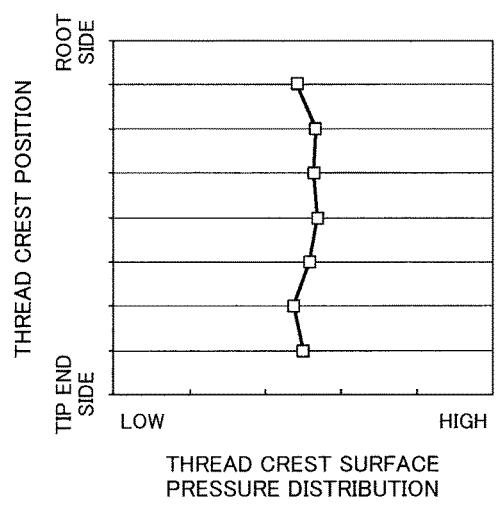

For that reason, in this embodiment, in order to reduce the pressure applied to the tip end of each tapered thread 11, as shown in FIGS. 5a and 5b, a tapered thread center hole 15 is provided in a bottom surface of an external thread of the tapered thread 11 to reduce excessive contact surface pressure that is produced at a contact surface between the external thread of the thread tip end and an internal thread. That is, the tapered thread center hole 15is formed in the bottom surface of the external thread of the tapered thread 11 comprising the taper-shaped external thread that is threadedly engaged with a taper-shaped internal thread (a corresponding shroud lock pin hole 9) that is formed in the turbine casing 8 that is a member to be fastened.

A diameter and depth of the tapered thread center hole 15 provided at the external thread is set in such a manner to allow the contact surface pressure to become uniform from the tip end to root of the tapered thread.

As shown in FIG. 4b, the contact surface pressure is considerably increased at a portion extending to the tip end side from a half position of an axial length (L) of the external thread. In this embodiment, in order to effectively reduce the contact surface pressure without decreasing the strength of the external thread, the depth of the tapered thread center hole 15 is not more than a half of the axial length (L) of the external thread.

In this embodiment, in this way, the shape of the tapered thread center hole 15 is optimized, the pressure which is applied to the tip end side of the tapered thread 11 and becomes high is reduced, and the pressure applied to the portion of the tapered thread that extends to the tip end from the root of the tapered thread 11 is adapted to become substantially uniform. Thereby, considerable reduction in the galling occurring at the tapered thread 11 can be expected.

Incidentally, the present invention is not limited to the above-mentioned embodiment and includes various modifications. For example, the above-mentioned embodiment has been explained in details in order to facilitate understanding of the present invention and is not always limited to an embodiment including all the elements that have been explained. Moreover, it is possible to replace a portion of a structure of a certain embodiment with a structure of another embodiment and it is possible to add a structure of a certain embodiment to a structure of another embodiment. Moreover, it is possible to add a structure of a certain embodiment to a portion of a structure of another embodiment, delete the portion of the structure of the embodiment, and replace the portion of the structure of the embodiment with a structure of another embodiment.

REFERENCE SIGNS LIST

1: Compressor
2: Combustor
3: Turbine
4: Turbine moving vane
5: Turbine stationary vane
6: Shroud segment
7: Key structure
8: Turbine casing
9: Shroud lock pin hole
10: Shroud lock pin
11: Tapered thread
12: Tapered thread axial force
13: Radial component of a tapered thread axial force
14: Combusted gas leakage pass
15: Tapered thread center hole

What is claimed is:

1. A gas turbine comprising a compressor adiabatically compressing air taken in from the atmosphere, as operation fluid, a combustor mixing and combusting the compressed air supplied from the compressor and fuel, to thereby produce high temperature-high pressure gas, and a turbine in which moving vanes and stationary vanes are alternately arranged, the turbine being adapted to generate rotary power at the time of expansion of the combusted gas introduced from the combustor; wherein shroud segments are provided at upper portions of the moving vanes, the shroud segments are axially and radially fixed to a turbine casing and circumferentially fixed to the turbine casing by shroud lock pins that are inserted into shroud lock pin holes formed in the turbine casing, and covers are provided to the shroud lock pin holes by tapered threads, wherein each of the tapered threads is a taper-shaped external thread that is threadedly engaged with a taper-shaped internal thread formed in a member that is to be fastened, wherein a center hole is formed in a center of a bottom surface of the taper-shaped external thread, and a depth of the center hole is not more than half of an axial length of the taper-shaped external thread, wherein
a diameter and the depth of the center hole are set in such a manner to suppress an increase of a contact surface pressure at a portion extending to a tip end side from a half position of an axial length of the external thread.

* * * * *